United States Patent
Aharon

(10) Patent No.: US 10,142,621 B2
(45) Date of Patent: Nov. 27, 2018

(54) MASS PRODUCTION MTF TESTING MACHINE

(71) Applicant: Oren Aharon, Haifa (IL)

(72) Inventor: Oren Aharon, Haifa (IL)

(73) Assignee: Oren Aharon, Haifa (IL)

( * ) Notice: Subject to any disclaimer, the term of this patent is extended or adjusted under 35 U.S.C. 154(b) by 0 days.

(21) Appl. No.: 15/218,125

(22) Filed: Jul. 25, 2016

(65) Prior Publication Data

US 2017/0048517 A1 Feb. 16, 2017

(51) Int. Cl.
  *G01B 9/00* (2006.01)
  *H04N 17/00* (2006.01)
  *G01M 11/02* (2006.01)

(52) U.S. Cl.
  CPC ...... *H04N 17/002* (2013.01); *G01M 11/0207* (2013.01); *G01M 11/0257* (2013.01)

(58) Field of Classification Search
  CPC .................................. G01B 9/00; G01N 21/17
  USPC ...................................... 356/124, 124.5, 125
  See application file for complete search history.

(56) References Cited

U.S. PATENT DOCUMENTS

| | | | | |
|---|---|---|---|---|
| 4,151,654 A | * | 5/1979 | Hashimoto | G01B 5/0002 33/507 |
| 4,776,692 A | * | 10/1988 | Kalawsky | G01M 11/00 356/239.1 |
| H999 H | * | 12/1991 | Merkel | G01N 21/8851 250/559.08 |
| 5,220,614 A | * | 6/1993 | Crain | G06K 9/00 348/128 |
| 6,072,570 A | * | 6/2000 | Chipman | G01M 11/0257 356/124 |
| 7,535,557 B2 | * | 5/2009 | Wu | G01B 11/272 356/127 |
| 2007/0279619 A1 | * | 12/2007 | Chang | G01M 11/0207 356/124 |

* cited by examiner

*Primary Examiner* — Roy M Punnoose

(57) ABSTRACT

A unique electro optical design will be disclosed, implemented for MTF measurements of multiple optical elements. The measurements are performed over a wide field of view by collimators moving in parallel in a synchronized manner while maintaining accuracy. The movement is angular over a wide angle and in two perpendicular directions—pitch and yaw. By design, each said collimator element will perform its angular movement while protecting towards the center of lens under test from remote. Thus, the collimators' center of rotation will be the central point of each lens' input aperture. By shifting a tray loaded with lenses, a different batch will be tested on each sequence. The apparatus is suitable for testing both camera and lenses simultaneously. The apparatus will preferably test lenses or cameras directly on the production floor.

16 Claims, 5 Drawing Sheets

MASS PRODUCTION MTF TESTING MACHINE

BACKGROUND OF THE INVENTION

1. Field of Invention

As the demand for higher quality and higher resolution optical systems has become prevalent, both designers and metrology scientists demand mass production test stations for optical elements. Consequently, this technology is expected to be standard procedure. Prior art's slow MTF measurement technique is expensive and inadequate for mass production. Current proposed art will solve this and other important drawbacks by simultaneously testing multiple cameras. The proposed parallel testing method will be fast and accurate while meeting the market requirements and fulfill the growing need.

This novel art will enable measuring MTF and other optical parameters in parallel formation within one test station.

The Modulation Transfer Function (MTF) is an important aid which is necessary for objective evaluation of the image-forming capability of optical systems. Not only that the MTF provides a means of expressing the imaging quality of optical systems objectively and quantitatively, but it can be calculated from the lens design data. Moreover, other parameters which are also very important, such as field of view, focal length and similar parameters can be measured by the proposed art.

This technology allows optical and systems designers to predict and test reliably the performance of the optical systems. The manufacturers can compare the image quality of the camera and lenses with the design expectations.

The present invention is related to the field of MTF testing procedure of lenses or digital cameras used in mass production. Therefore, for this application, quality and high speed are the most important parameters. More specifically, the invention is related to the utilization of an innovative device capable of measuring a tray loaded with multiple elements. Measurement is simultaneously performed by using multiple telescopes or collimators shifted in parallel while each collimator or telescope rotates and projects its image to the center of each lens under test. Other relevant measurements are focal length, focusing position field of view and other optical parameters. One advantage of the presented innovations is the mechanical arrangement enabling parallel collimators or telescopic cameras movement where each device is rotating around the center of each lens under test from remote.

By irradiating from multiple points around the lens center, performance over its field of view or MTF values can be computed.

Thus a method and apparatus are disclosed for fast parallel testing of multiple lenses or cameras.

2. Description of the Related Art

Modulation Transfer Function or "MTF" is a measurement of the optical performance of a lens. MTF charts can give a precise measurement of the optical quality of various lenses.

An MTF chart plots the contrast and resolution of a lens from the center of its field of view to its edges against a "perfect" lens that would transmit 100% of the light that passes through it. The contrast of a lens is important as this works in correlation to lens resolution.

Using an MTF chart is the preferred method for studying lens optical performance as it uses theoretical equations to plot a performance graph and doesn't rely on subjective human opinion.

The typical graph displays y-axis (vertical axis) of an MTF chart plots the transmission of light through the lens with a maximum value of "1.0" which would indicate 100% transmittance of the light, as a function of image-resolution chart, and usually as the lines are denser, the transmittance is lower until it reaches zero value.

The measurement principle of prior art systems is based on mounting multiple stationary telescopic cameras at different angles in respect to the lens under test. Due to the relatively high telescopic camera dimensions, this arrangement tends to be massive and expensive—for some applications as many as 17 different telescopic cameras are being used. Since the telescopes are deployed around a single point, it is needed for them to be mounted at a great distance to prevent mutual obstructions. Testing is performed on a one-by-one procedure, where each lens is shifted to the testing position, tested, shifted away from the position, and then the next one is moved to the testing position. This method which is currently used is time consuming and lacks the flexibility of testing different lenses with the same set-up. The test target is an illuminated reticule which carries crosshair type test patterns of a few microns line width and sub-micron lithographic accuracy.

The disclosed art will be free of prior art disadvantages by allowing simultaneous measurements of multiple lenses using one telescopic camera per lens, by creating different angular directions of telescopic cameras, performed by a precise mechanism that moves all telescopes in parallel, each having the center point located at the center of each lens under test. Using an innovative spatial link, the accurate movement is fast and achieved by one motor per direction. Precise angle measurements are performed by yet another feature of the invention by projecting a laser beam into a specialized angular measurement device.

The telescopic cameras are moved in synchronization to various angular directions by two orthogonally mounted motors. Each telescope's angular position is controlled by software and adjusted to the camera under test. For each field angle there is a designated CCD telescope which images a magnified image of the test pattern to the CCD sensor. The disclosed art significantly reduces the total measurement time compared to traditional MTF testers thanks to the common movement of its telescopes, enabling multiple lens measurements simultaneously. Moreover, increased systems designed flexibility will allow changing direction of telescopic cameras by software for adaptation to various types of lenses.

The projected image is analyzed by a computer to which the streaming data is fed to. The computer will analyze data as a function of tilt angles, generating various MTF curves for all cameras under test. Based on the results the computer will generate a pass/fail report.

SUMMARY OF THE INVENTION

Testing methods and systems suitable for testing lenses and cameras for mass production are described, using innovative mechanical mechanism for moving multiple telescopes or cameras or a combination of both, each telescope having a center of rotation position around the lens center under test. Each of the respective telescopes has a significantly higher focal length and aperture relative to the tested lens and examines the projected image from lens under test to calculate its MTF value as a function of the angular movement. For camera testing, the preferred embodiment will be replacing the camera equipped telescopes with image projecting collimators and examining imaging quality using a computer. Each image is processed to find the largest pixel value therein and the smallest pixel value therein, and a difference between the largest and smallest pixel values is computed. The computed analysis for each lens or camera will be compared to the respective specifications, and a pass or fail is map will be generated for the system. Other embodiments are also described, including different number of telescopes or telescopes in the far IR wavelength region, for example as part of other automated camera devices.

The above summary does not include an exhaustive list of all aspects of the present invention.

BRIEF DESCRIPTION OF THE DRAWINGS

The embodiments of the invention are illustrated by way of example and not by way of limitation in the figures of the accompanying drawings in which like references indicate similar elements.

DETAILED DESCRIPTION OF EMBODIMENTS

Several embodiments of the invention with reference to the appended drawings are now described. Other instances, well-known circuits, structures, and techniques have not been shown in detail so as not to obscure the understanding of this description.

There are various defects that appear during the manufacturing of digital cameras. One serious defect (that can result in a camera specimen being rejected during manufacture testing) is related to lens performance—that why it is important to test each lens independently from its camera. Moreover, defects could be related to the camera full assembly where defects may be manifested as a drop in imagining quality of a test scene captured by a unit or device under test is displayed. A good manufacturing practice in this case is to test both lens and camera assembly which the disclosed art will do.

As shown in the disclosed figures, the testing procedure for camera lens includes an array of illuminated targets projecting a structured image towards an array of testing telescopes equipped with high resolution cameras. In this configuration, the camera and telescopes are tilted in pitch and yaw directions. The telescopic cameras are parallel and their center of rotation is concentric with under test instantaneous optical center of lens under test center, as described in FIG. 2. FIG. 3 shows a somewhat different configuration which describes the testing procedures for cameras where the tilting telescopic cameras are replaced with collimators projecting an image towards the cameras under test and the image generated by each camera is upload to a computer for quality testing according to the MTF criteria.

The embodiments of the invention here are automated systems and processes for testing quality of lenses and camera using MTF criteria pass/fail device. The camera device may be a digital or analog camera module that can be integrated into a consumer electronic device or into any other electronic component or device in which digital camera functionality may be embedded, including professional digital video and still cameras.

The processes can detect dark MTF or similar degradation tests between ideal image to actual image within a digital image that has been captured by a solid-state imaging sensor of the camera device under test or lens under test. One or more of the techniques described here may have a better capability to distinguish between good or bad elements and generate a pass/fail map of the loaded tray under test, thereby improving the production quality.

Figure 1:
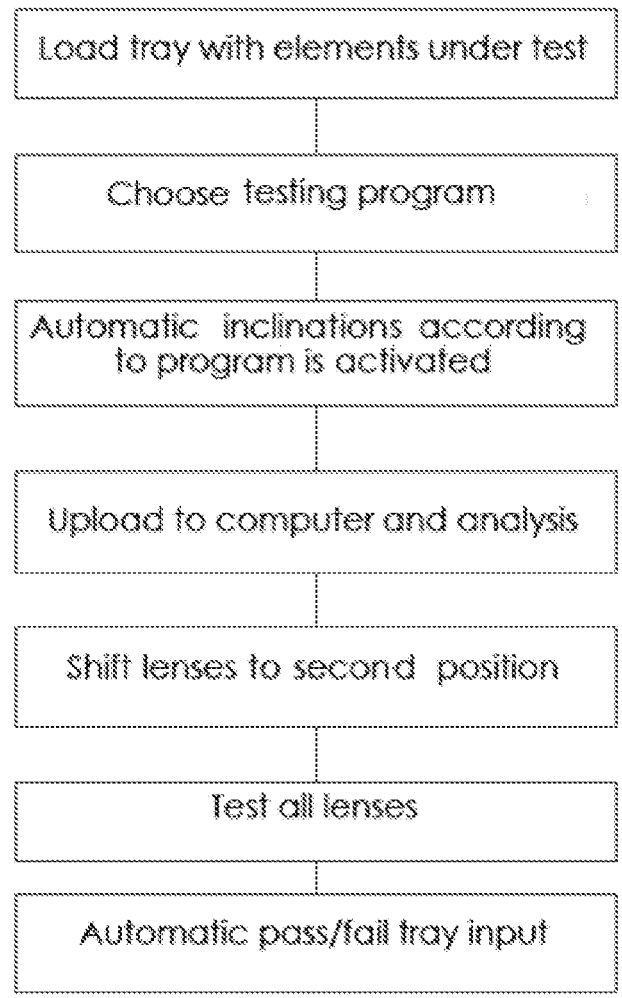
FIG. 1 is a block diagram of a camera testing system.

FIG. 1 is an example of a block diagram describing the computerized test system that may be deployed in a manufacturing test environment for testing high volume production. Initially, a tray with multiple elements to be tested is automatically or manually loaded. Via a computer interface GUI, the user will choose the testing program and the adequate multiple inclination angles. Accordingly, inclination of multiple telescopes or collimators is performed, and images produced from each inclination angle are recorded and analyzed by a computer, data is processed, and the next yet untested devices are moved to testing position. This process is repeated until all the cameras and elements on the tray are tested, then finally the computer generates a pass\fail map for elements on tray.

Figure 2:
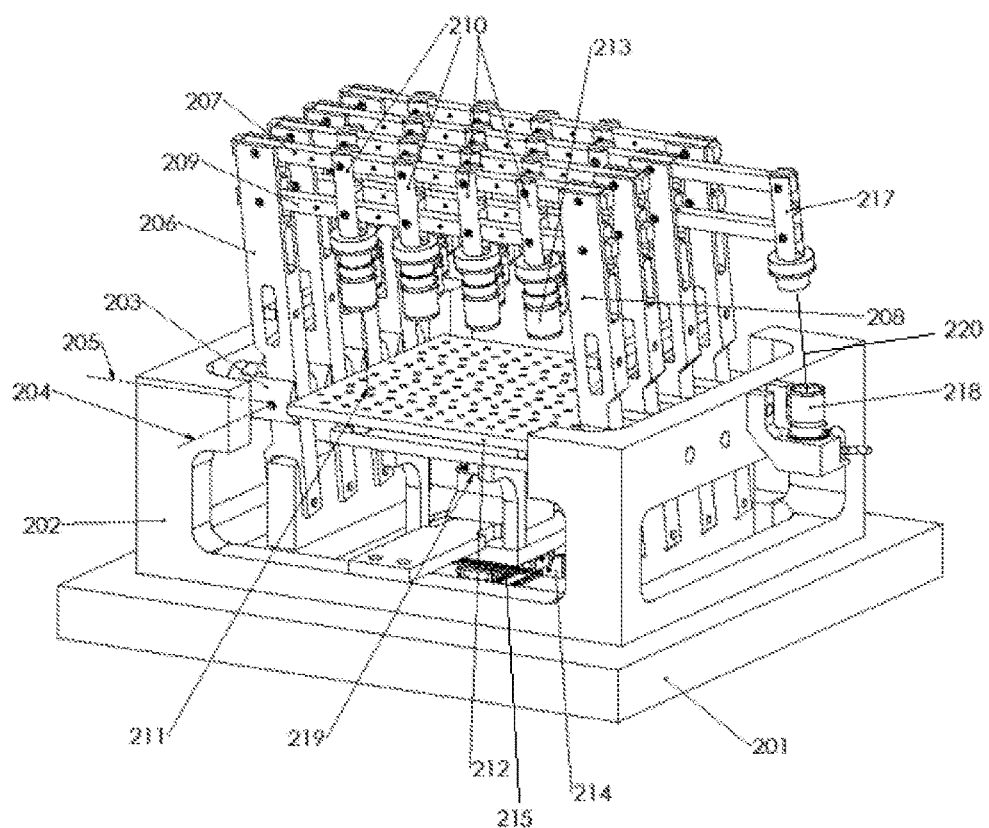
FIG. 2 show the test station at an inclination position.
Figure 3:
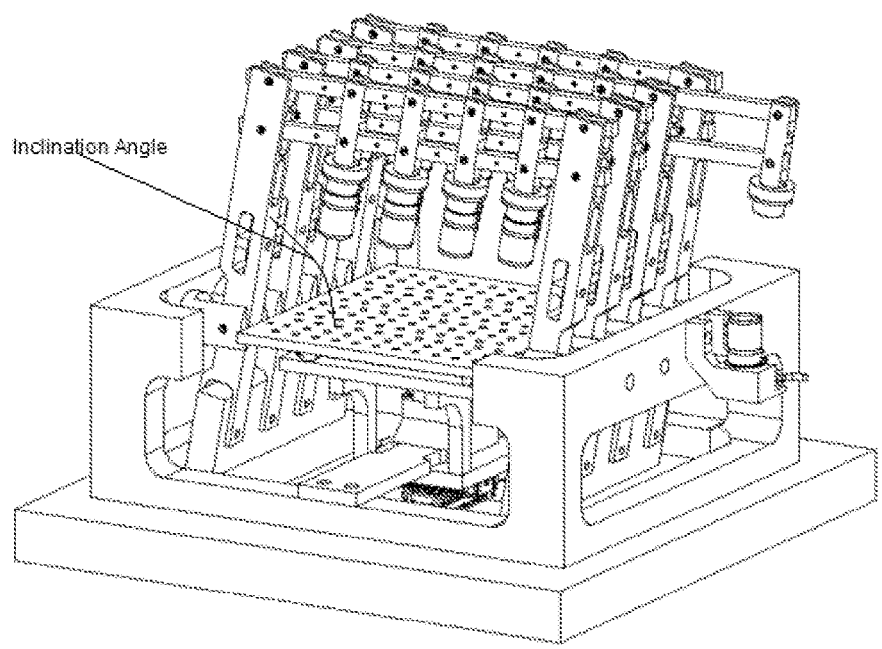
FIG. 3 shows the test station with camera telescopes inclination in a perpendicular axis of rotation.

Referring to FIG. 2, this figure shows a design for lens testing. First the system is mounted on an optical table denoted as 201; the mounting is performed by attaching test station frame 202 to the optical table. The mounting frame has several dual axis swivel cylindrical elements denoted as 203, having two perpendicular rotation axes 204 and 205 respectively a parallelogram is created by members 206, 207 and 208, additionally members 209 are connected in parallel to the parallelogram and thus moving in parallel with member 207. The center of rotation of each member of 210 is commonly denoted as 220, and lying on the lens holding tray denoted as 212, each member denoted as 210 has a center of rotation on a point on the trays' surface. In this specific configuration there are 15 members similar to the 210, all moving on parallel and having a specific rotation point on the tray surface. The under test lenses or cameras will be positioned exactly at those rotation centers, causing testing telescopes or collimators denoted as 213 to point to the tested lens regardless of its angle of inclination. Member 213 creates another parallelogram perpendicular to first said parallelogram, enabling a dual axis inclination just by rotating the respective axis of member 203.

Since only 15 testing telescopes denoted as 213 are displayed in this typical figure, for testing larger lens numbers the tray should be shifted in parallel to a new position for testing additional 15 lenses—this is accomplished by an XY table, where X direction is denoted as 215 and Y direction is denoted 214, is attached to the tray by 219. Element 217 is a laser pointer, projecting a collimated laser beam that moves in parallel with elements 210. The laser beam is directed to element 218 which is an angle meter measuring the angle projected by 217 element.

First, the selected 15 lenses are examined for various inclination angles according to a specific test procedure. Upon completion, the next 15 lenses are shifted by an XY table to obtain testing results for next batch. The procedure is repeated until all lenses populating the tray are tested.

Referring now to FIG. 3, a typical inclination angle is shown which is around an axis in perpendicular direction to the one shown in FIG. 2.

Figure 4:
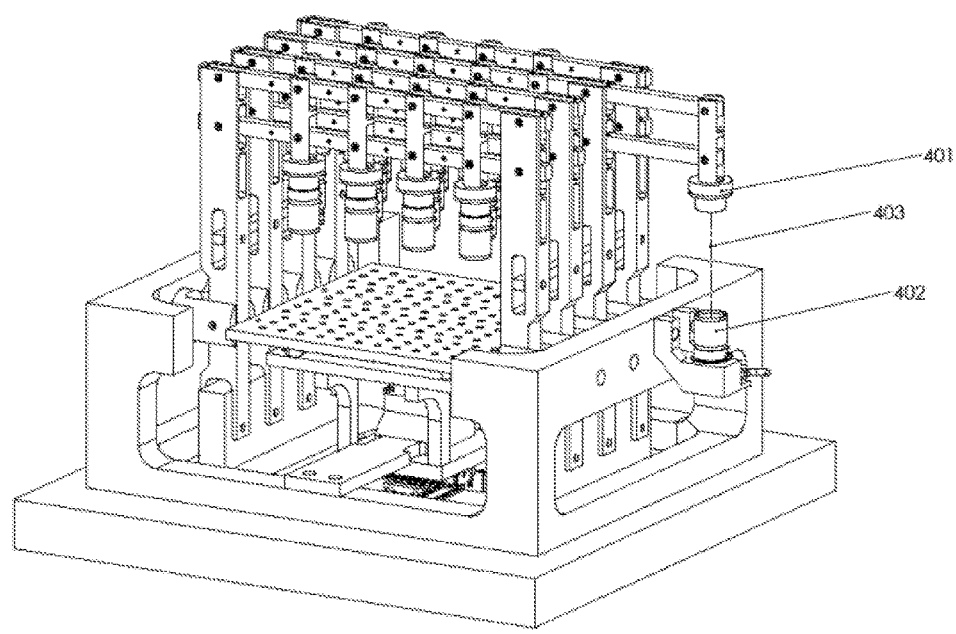
FIG. 4 shows another position without any inclination.

Referring now to FIG. 4, a zero inclination is displayed, for accurate inclination measurements a laser device projects a collimated light beam 403 into an angle meter element denoted as 402 which senses the inclination angle, since laser element 401 is a part of the dual axis parallelogram its angle is identical to system inclination.

Figure 5:
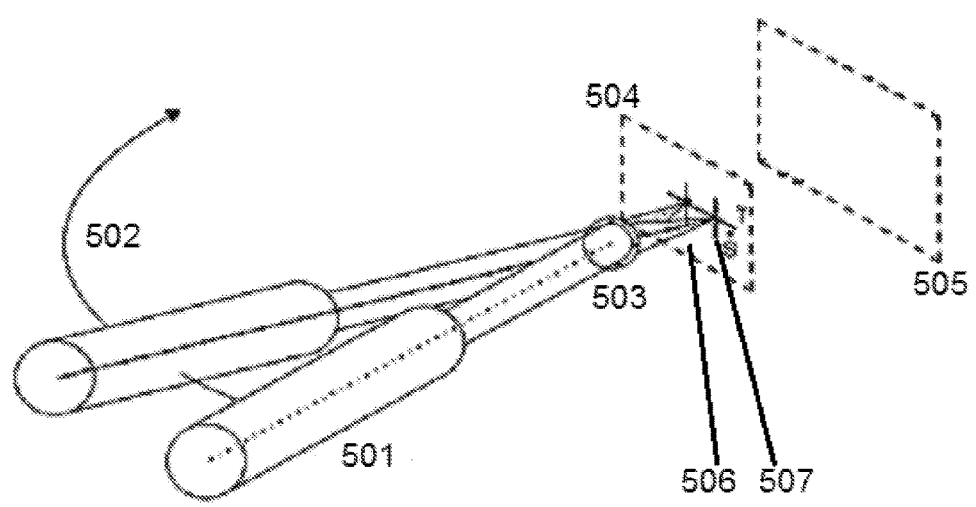
FIG. 5 shows an image of a single camera telescope and its respective lens under test out of the multiple lens telescopes assembly.

Referring now to FIG. 5, which shows an image of a single camera telescope and its respective lens under test out of the multiple lens telescopes assembly, the testing telescopes or collimators denoted as 501 point towards the center of the tested lens denoted as 503, and by shifting to a different angle performed by the parallelogram mechanism and denoted as 502, the two targets denoted as 506 and 507 on the image-plane denoted as 504 are displayed and analyzed by the telescopic cameras. The targets 506 and 507 on 504 are illuminated by the uniform illuminating plate denoted as 505.

To summarize, the system is a computerized testing method and apparatus for multiple camera lenses and camera modules, comprising:

A plurality of telescopic cameras receiving a projected image from lenses under test.

Converting each received image into digital data.

A mechanical device capable of placing the plurality of telescopic cameras in multiple angles positions around the center of each aperture of said lenses, without obstructing the line of sight of each other.

A mechanical tray for organizing the lenses in a specific way.

An XY motorized table for said mechanical tray.

A reference target array placed at the imaging plane of each lens under test.

An illumination device for said targets.

A computer for controlling the angle of telescopes and the relative XY position of lens tray according to a test setup and requirements.

Processing multiple images from different angles of telescopic cameras calculating image quality of projected target through the lens under test.

Comparing the computed difference for each of the respective lens to specifications within a threshold and signaling a pass or fail in response for each of the corresponding lens.

Moreover, the orientation of the collimators array is measured by a collimated laser projector and an angle meter.

Furthermore, the lens array is mounted on a Z lifting motorized axis for focusing said target array relative with lens under test as denoted in FIG. 2 as 219.

As shown, the mechanical device rotating the telescopes is based on a 3D dual dimensional bar link wherein the rotation point of each telescope is in the aperture center of each lens under test.

Furthermore, for testing multiple cameras, the telescopes are replaced by a plurality of collimators projecting an illuminated structured image towards lenses or camera modules under test.

A mechanical device capable of placing the plurality of telescopic cameras at multiple angles relative to the center of each aperture of said lenses or cameras under test, without obstructing the line of sight to each other.

Converting each received image into digital data.

A mechanical tray for organizing the lenses or cameras in a specific formation.

An XY motorized table for said mechanical tray.

An imaging device located at the image plane of each lens.

A computer for controlling the angle of telescopes and the relative XY position of lens tray according to the test setup and requirements, processing multiple images from different angles calculating image quality of a projected target through the lens under test.

Comparing algorithms, analyzing each respective lens to its specifications and signaling a pass\fail for each lens.

The method and apparatus will then automatically generate a performance map of the tray under test with pass/fail marking according to MTF characterization.

For greater flexibility, the apparatus and method as described will combine said collimators or telescopic cameras into one unit of collimator with built in camera and beam splitter.

The method and apparatus as described where the collimators or telescopic camera are in the NIR region to far IR region optimized for testing thermal cameras or thermal lenses The method and apparatus as described where the analyzed data for each lens will be used for computing an evaluation of lens performance and generate a signal map, having a plurality of values for each lens, wherein each lens meeting a predetermined performance criteria will be designated as pass otherwise it will be designated as fail.

The test system operations might alternatively be performed by any combination of parallel moving collimators or telescopes according to specific measurements needs.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A device for measuring Modulation Transfer Function of multiple lenses, comprising:

a plurality of parallel angular moving telescopic cameras having their center of rotation concentric with their respective measured lenses;

a mechanical tray for organizing said lenses in a specific formation, placing each lens in said center of rotation of said telescopic cameras;

a reference target array placed at the imaging plane of each said lens under test;

an illumination device for said targets array;

an XY motorized table, carrying said mechanical tray;

a computing device for controlling the angle of said telescopic cameras and said XY motorized table;

a mechanical device that places the plurality of telescopic cameras in multiple angles and rotates around the center of each aperture of said lenses, without obstructing the line of sight of each other;

a computer processor comprising an algorithm configured to analyze multiple images from different angles of said moving telescopic cameras, and calculating the Modulation Transfer Function of lenses under test;

a computing device analyzing projected image which is fed by said telescopic cameras through a streaming video via a digital interface, wherein said computing device comprises an algorithm configured to analyze the streaming data; and wherein said computing device further comprises an algorithm that is configured to analyze each lens performance by comparing the respective lens performance to its specifications and output an alert signal if said performance is outside of said specifications.

2. The device of claim 1 wherein the reference target array is mounted on a Z lifting motorized axis for focusing.

3. The device of claim 1 wherein the mechanism rotating the telescopes is based on a 3D dual dimensional bar link wherein the rotation point of each telescopic camera or collimator is in the aperture center of each lens of the device under test.

4. A device for Modulation Transfer Function measuring of multiple camera lenses and modules comprising:
  a plurality of parallel moving collimators projecting an illuminated structured image having their center of rotation concentric with their respective measured camera modules;
  a mechanical tray for organizing the said camera modules in a specific formation;
  reference targets placed at the imaging plane of each said moving collimator;
  an illumination device for said targets in the image plane of said collimators;
  an XY motorized table, carrying said mechanical tray;
  a computing device for controlling the angle of said collimators and said XY motorized table;
  a computer processor comprising an algorithm configured to analyze multiple images from different angles of said moving collimators, and calculating the Modulation Transfer Function of said camera modules under test;
  a computing device analyzing projected image which is fed by said camera modules under test through a streaming video via a digital interface, wherein said computing device comprises an algorithm configured to analyze the streaming data;
  a mechanical device capable of placing the plurality of said collimators in multiple angles rotating around the center of each aperture of said camera modules, without obstructing the line of sight of each other; and
  wherein said computing device further comprises an algorithm that is configured to analyze each camera module performance by comparing the respective camera module performance to its specifications and output an alert signal if said performance is outside of said specifications.

5. The device of claim 1 or 4 wherein computation- and evaluation of data from each lens or camera module performance is displayed as a pass/fail map according to Modulation Transfer Function characterization.

6. The device of claim 1 or 4 wherein said collimators or telescopic cameras are replaced by a collimator with built-in camera, beam splitter and reference target.

7. The device of claim 1 or 4 wherein the collimators or telescopic cameras are in the NIR region to far IR region, optimized for testing thermal cameras or thermal lenses.

8. The device of claim 1 or 4 wherein the analyzed data of each lens is used for evaluating lens performance and generates a signal map having a plurality of values for each lens, wherein a lens meeting a predetermined performance criteria is designated as pass, otherwise it is designated as fail.

9. A method for measuring Modulation Transfer Function of multiple lenses, comprising:
  Moving a plurality of parallel telescopic cameras having their center of rotation concentric with their respective measured lenses;
  organizing the lenses on a mechanical in a specific formation, placing each lens in said center of rotation of said telescopic camera;
  Placing a reference target array at the imaging plane of each lens under test;
  Illuminating said targets array with an illumination device;
  Carrying said mechanical tray with an XY motorized table;
  Controlling the angle of said telescopic cameras and said XY motorized table with a computing device;
  Rotating the plurality of telescopic cameras in multiple angles around the center of each aperture of said lenses, without obstructing the line of sight of each other by a mechanical device;
  Processing an algorithm that analyzes multiple images from different angles of said moving telescopic cameras, and calculating the Modulation Transfer Function of lenses under test by configuring a computer processor;
  analyzing projected images which are fed by said telescopic cameras through a streaming video via a digital interface, by a computing device which comprises an algorithm configured to analyze the streaming data; and
  analyzing each lens performance by said computing device and an algorithm comparing the respective lens performance to its specifications and outputs an alert signal if said performance is outside of said specifications.

10. The method of claim 9 wherein the reference target array is mounted on a Z lifting motorized axis for focusing.

11. The method of claim 9 wherein the mechanism rotating the telescopes is based on a 3D dual dimensional bar link wherein the rotation point of each telescopic camera or collimator is in the aperture center of each lens of the device under test.

12. A method for Modulation Transfer Function measuring of multiple camera modules comprising:
  Moving a plurality of parallel collimators projecting an illuminated structured image having their center of rotation concentric with their respective measured camera modules;
  organizing the said camera modules in a specific formation on a mechanical tray;
  placing reference targets at the imaging plane of each said moving collimator;
  illuminating said targets in the image plane of said collimators with an illumination device;
  Carrying said mechanical tray with an XY motorized table;
  Controlling the angle of said collimators and said XY motorized table with a computing device;
  Analyzing multiple images from different angles of said moving collimators, and calculating the Modulation Transfer Function of said camera modules under test by configuring a computer processor;
  analyzing projected images which are fed by said camera modules under test through a streaming video via a digital interface, by a computing device which comprises an algorithm configured to analyze the streaming data;
  placing the plurality of said collimators in multiple angles rotating around the center of each aperture of said camera modules, without obstructing the line of sight of each other by a mechanical device; and
  analyzing each lens performance by said computing device and an algorithm comparing the respective lens performance to its specifications and outputs an alert signal if said performance is outside of said specifications;
  analyzing each camera module performance by comparing the respective camera module performance to its specifications and outputting an alert signal if said performance is outside of said specifications.

13. The method of claim 9 or 12 wherein computation of the signal map and evaluation of each lens or camera module performance is displayed as a pass/fail map according to Modulation Transfer Function characterization.

14. The method of claim 9 or 12 wherein said collimators or telescopic cameras are replaced by a collimator with built in camera, beam splitter and reference target.

15. The method of claim 9 or 12 wherein the collimators or telescopic cameras are in the NIR region to far IR region, optimized for testing thermal cameras or thermal lenses.

16. The method of claim 9 or 12 wherein the streaming data is used for evaluating the performance of lens or camera and generates a signal map having a plurality of values for each lens or camera, wherein a lens or camera meeting a predetermined performance criteria is designated as pass, otherwise it is designated as fail.

\* \* \* \* \*